(12) United States Patent
Tabrizi

(10) Patent No.: US 6,911,819 B1
(45) Date of Patent: Jun. 28, 2005

(54) ROTARY TO LINEAR LVDT SYSTEM

(75) Inventor: Sohail Tabrizi, Castaic, CA (US)

(73) Assignee: Kavlico Corporation, Moorpark, CA (US)

( * ) Notice: Subject to any disclaimer, the term of this patent is extended or adjusted under 35 U.S.C. 154(b) by 0 days.

(21) Appl. No.: 09/632,223

(22) Filed: Aug. 4, 2000

(51) Int. Cl.$^7$ .............................. G01B 7/14; F16H 29/02
(52) U.S. Cl. ............................ 324/207.18; 324/207.24; 74/89
(58) Field of Search ...................... 324/207.18, 207.24, 324/207.22; 74/89, 89.23, 89.35; 340/870.36

(56) References Cited

U.S. PATENT DOCUMENTS

| | | | |
|---|---|---|---|
| 2,445,445 A | 7/1948 | Rights et al. | 177/351 |
| 4,777,436 A | 10/1988 | Fiori, Jr. | 324/208 |
| 5,006,797 A | 4/1991 | Smith | 324/173 |
| 5,129,273 A | * 7/1992 | Fukui et al. | 74/89.35 |
| 5,289,120 A | 2/1994 | Moretti et al. | 324/174 |
| 5,469,053 A | 11/1995 | Laughlin | 324/207.18 |
| 5,547,290 A | 8/1996 | Ouchi et al. | 384/448 |

* cited by examiner

Primary Examiner—Walter E. Snow
(74) Attorney, Agent, or Firm—Jeffer, Mangels, Butler & Marmaro LLP

(57) ABSTRACT

A rotary input for a linear variable differential transformer (LVDT) system connects to a gear reduction system. The gear reduction produces a reduced rotary output in a rotary output member. The output member is threaded, and a nut is threaded onto the output member. Therefore, the nut translates as the rotary output member rotates. The armatures of one or more LVDTs attach to the nut. Each armature contains a magnetic member. As the nut translates along the threaded output member, the nut translates the armatures. Armature movement moves the magnetic members to create a differential voltage between the secondary coils of the LVDT.

9 Claims, 1 Drawing Sheet

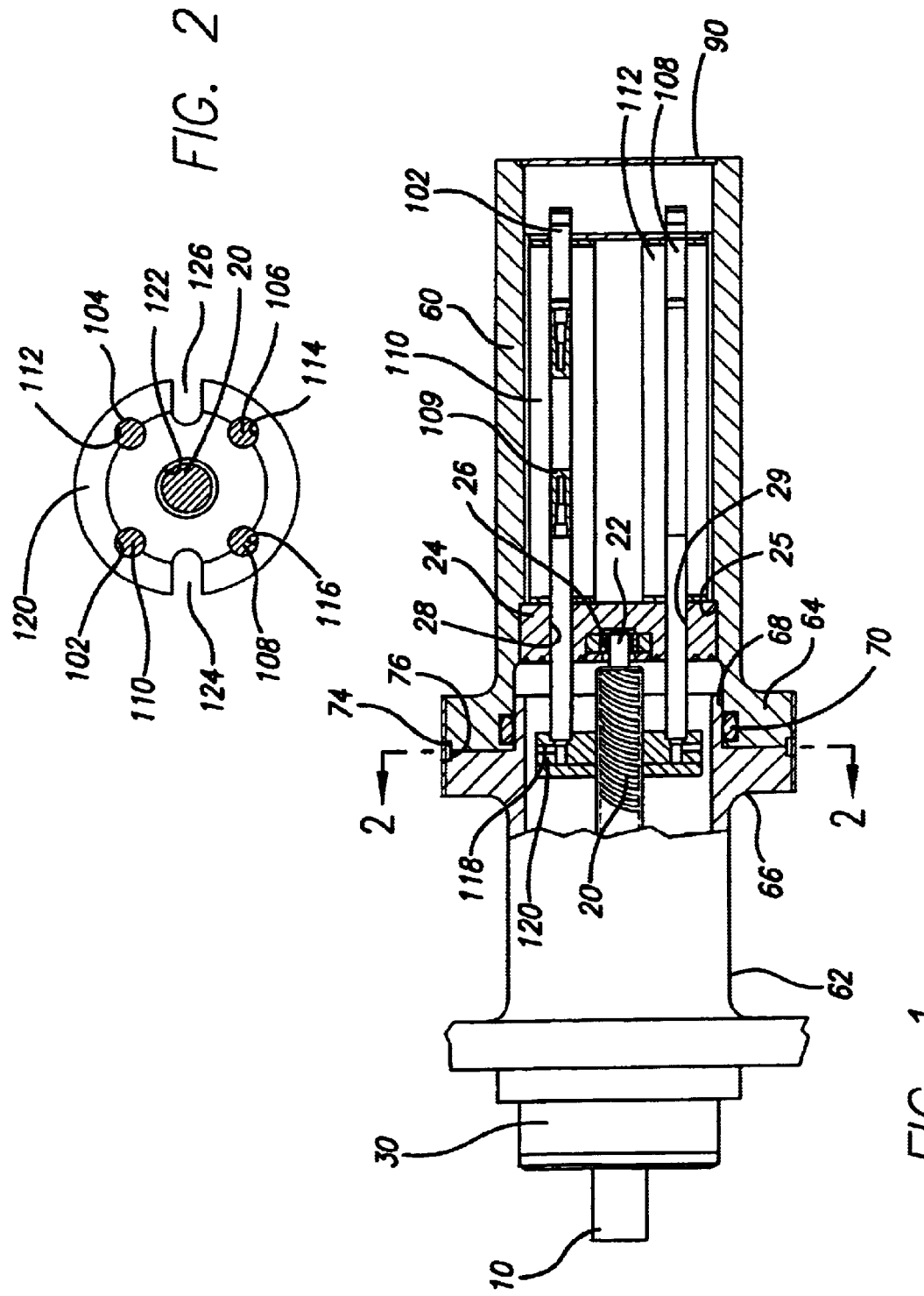

ROTARY TO LINEAR LVDT SYSTEM

BACKGROUND OF THE INVENTION

1. Field of the Invention

The present invention relates to a device that uses a linear variable differential transformer (LVDT) for measuring rotation of a shaft.

2. General Background and State of the Art

A linear variable differential transformer (LVDT) is a displacement transducer that produces an electrical signal proportional to the displacement of a moveable core (armature) within a cylindrical transformer. The transformer consists of a central, primary coil winding and two secondary coil windings on opposite ends of the primary winding. The coil windings are coaxial. The armature preferably is nickel-iron and is positioned within the coil assembly. The core provides a path for magnetic flux linking the primary coil to the secondary coils.

When the primary coil is energized with an alternating current, a cylindrical flux field is produced over the length of the armature. This flux field produces a voltage in each of the two secondary coils that varies as a function of the armature position. Armature movement moves the flux field into one secondary and out of the other causing an increase in the voltage induced in one secondary and a corresponding voltage decrease in the other. The secondary coils are normally connected in series with opposing phase. The net output of the LVDT is the difference between the two secondary voltages. When the armature is positioned symmetrically relative to the two secondary windings (the "null" position), the differential output is approximately zero, because the voltage of each secondary is equal but of opposite phase.

Subjecting an actuator to pressure or force can move an LVDT armature through a linkage. Thus, LVDTs are commonly used in pressure transducers. As pressure increases, the armature moves toward one secondary winding and away from the other. This yields a voltage difference that can be proportional to the pressure on the transducer. Consequently, this voltage output can measure pressure and position.

Nearly all LVDTs that are designed for aircraft or missile applications are wound on an insulated stainless steel spool, magnetically shielded and enclosed in a stainless steel housing using welded construction. The armature is normally made from a 50% nickel-iron alloy and brazed to a stainless steel extension. Secondary leads are usually shielded to minimize channel-to-channel crosstalk for multichannel units and to shield components from RF energy.

The length and diameter of an LVDT must be sufficient to allow adequate winding space for achieving the desired electrical performance, support any pressure requirement and withstand the environmental shock, vibration and acceleration. Where physical size is limited, electrical performance must be flexible. Although the LVDT is basically a simple device, the operating characteristics and electrical parameters are complex and depend to a large extent on the physical limitations.

U.S. patent application Ser. No. 09/547,511, filed Apr. 12, 2000, which is assigned to the assignee of this application, discusses some of the parameters that designers consider when specifying the sizes of LVDT components. That discussion and the remainder of the application are incorporated by reference.

An LVDT's output voltage is proportional to the voltage applied to the primary. System accuracy depends on providing a constant input to the primary or compensating for variations of the input by using ratio techniques. The output can be taken as the differential voltage or, with a center tap, as two separate secondary voltages whose difference is a function of the displacement. If the sum of the secondary voltages is designed to be a specific ratio of the difference voltage, overall accuracy significantly improves.

Most LVDTs deal with a linear mechanical input in that a force acts on a probe that directly or indirectly carries the armature of the LVDT. The force moves the probe longitudinally along the axis of the probe. The device described in Ser. No. 09/547,511 is such a device. The output of some systems is rotational instead of linear. Consequently, there is a need for transducers that can measure the extent of a rotation. Rotary variable differential transducers (RVDT) having a circular geometry are known. They have been employed to measure the angular position of a rotary shaft. Known rotary variable differential transformers are more difficult and expensive to manufacture than LVDTs, however.

In some instances, tying the rotational output to a single LVDT produces acceptable results. However, many systems benefit with increased accuracy from multiple LVDTs.

INVENTION SUMMARY

Providing an LVDT-based transducer that measures rotation is a principal object of the present invention. Designing such a system that is accurate and reliable is a related object. Another object is providing redundancy in such a transducer. These and other object are evident for the following description of the present invention.

The linear variable differential transformer (LVDT) system of the present invention comprises a rotary input. The input connects to a gear reduction system or rotary head, which produces a reduced, increased, or unchanged rotary output in an output member. The output member is threaded, and a nut is threaded onto the output member and translates as the output member rotates. The nut is restrained against angular rotation. The armatures of one or more LVDTs attach to the nut. Each armature assembly includes a magnetic member. Consequently, as the input rotates and the gear reduction causes the output member to rotate more slowly, the nut translates along the threaded output member. The movement of the armature assemblies moves the magnetic members to create a differential voltage output from the secondary coils of the LVDT.

BRIEF DESCRIPTION OF THE DRAWINGS

FIG. 1 is a side view, principally in section, of the rotary to linear LVDT system of the present invention.

FIG. 2 is a sectional view taken through plane 2—2 of FIG. 1 of the exemplary embodiment of the present invention.

DETAILED DESCRIPTION OF THE PREFERRED EMBODIMENTS

The LVDT system of the present invention attaches to a rotary input 10. The rotary input can be the rotary output of any device that rotates through a limited range of revolutions. For example, some positioning devices have shafts that rotate as position changes. One can determine the change of position of such a device by determining the extent of rotation of a shaft In the exemplary embodiment, the rotary output is a shaft 20 that extends from a gear reduction system 30 to a fixed support member 24. The fixed support member mounts within rear housing member 60. The rear housing may have a shoulder 25 to locate the fixed support member. The rear housing member attaches to the front housing member 62.

Rear housing member 60 has a radial flange 64 that butts up against radial flange 66 of front housing member 62. The front housing section also has an annular flange 68, which extends under the radial flange of the rear housing member. An O-ring 70 seals the two housing members. The radial flanges 66 and 64 are welded together at the joint 74.

Rear housing member 60 also has a rear section 90. Electric wires (not shown) extend out of section 90. The wires feed an A/C signal to the coil assemblies of the LVDT as discussed below.

The gear reduction system 30 between the input 10 and the rotary output 20 transfers the rotary input into rotation in the rotary output and may reduce the angular rotation of the rotary output relative to the angular rotation of the rotary input. Gear reduction systems are common and can include gears, pulleys or other simple machines for reducing or increasing an output relative to a rotating input.

As FIG. 1 shows, rotary output member 20 has a narrow diameter end 22. That end is supported within journaled housing 24. The journaled housing has bearings 26 or other friction-reducing means which support and allow the end 22 of rotary output member 20 to rotate freely. Support 24 may have multiple openings, only two, openings 28 and 29 are shown in FIG. 1. LVDT extensions 102, 104, 106 and 108 (FIG. 2) extend through the openings in the support housing. The openings are sufficiently large to allow the extensions to move longitudinally relative to the openings. The exemplary embodiment has four armatures, but the system would function with one, two, three, four or more armatures.

A coil assembly surrounds each armature. FIG. 1 shows two coil assemblies 110 and 112 surrounding extensions 102 and 108. The coil assemblies have a primary coil and two secondary coils as shown in Serial No. 09/547,511. FIG. 1 does not show the separate coils of the coil assemblies. The coil assemblies are fixed to support member 24. Because the support member remains stationary, the coil assemblies also do not move.

Rotary output member 20 is threaded, as FIG. 1 shows in part. Nut 120 (FIGS. 1 and 2) threads onto the threads of rotary output member 20. The inside of opening 122 of nut 120 is threaded to match the threads on the rotary output member 20. Thus, as the rotary output member 20 rotates, nut 120 translates along the rotary output member. Nut 120 has four openings 110, 112, 114 and 116 (FIG. 2) that receive the ends of the respective extensions 102, 104, 106 and 108. Fasteners may be provided to secure the armatures into the openings in the nut. Small channels 118 (FIG. 1) provide access for a mechanical fastener such as a set screw to attach the armature to the nut.

The nut may also have channels 124 and 126 for receiving guides (not shown) on the inside of the front or rear housing members 62 and 60 to prevent the nut 120 from rotating. In the exemplary embodiment, nut 120 may not translate into the rear housing 60. Therefore, any guide only would be mounted within front housing member 62. Each armature has a magnetic member 109 (FIG. 1). As output member 20 rotates and nut 120 translates relative to the output member, the four armatures also translate relative to support member 24. The direction of translation depends on the direction of rotation of rotary output member 20 and, of course, rotary input member 10. Translation of the magnetic members 109 within the extensions 102, 104, 106 and 108 moves the magnetic member closer to one secondary coil and farther from the other secondary coil in each coil assembly. As discussed in detail in application Ser. No. 09/547,511, the coils in the coil assemblies receive alternating current. As each armatures moves relative to the two secondary coils, the magnetic member within the aperture changes the inductance in the coils. That causes a voltage change in each coil assembly, and that voltage differential between the secondary coils is read by an electrical device attached at fitting 92.

Several components of the present invention contribute to system accuracy. First, there are four armatures and four coil assemblies. Any inaccuracies tend to balance out among the four sub-systems. Second, the fixed connections of the extensions 102, 104, 106 and 108 to nut 120 maintains the nut perpendicular to the rotary output member 20. This tends to minimize backlash and maximizes accuracy. Passing the armatures through openings 28 and 29 in fixed support 24 also contributes to system accuracy. Because the armatures are kept straight, they, in turn, keep the nuts 120 straight.

While the specification describes particular embodiments of the present invention, those of ordinary skill can devise variations of the present invention without departing from the inventive concept.

I claim:

1. A linear variable differential transformer (LVDT) system comprising:
   a) a rotary input;
   b) a rotary output;
   c) a gear reduction system between the rotary input and the rotary output for transferring the rotary input into rotation of the rotary output and reducing the angular rotation of the rotary output relative to the angular rotation of the rotary input;
   d) at least two LVTDs, each LVDT comprising an internal magnetic member and a coil assembly, the coil assembly comprising a primary coil between two secondary coils, an alternating current in the coil assembly, the LVDT measuring the differential voltage between the two secondary coils as the magnetic member moves relative to the two secondary coils; and
   e) a translating member translating on the rotary output and being operably connected to the magnetic members of the LVDTs.

2. A linear variable differential transformer (LVDT) system comprising:
   a) one or a multiple of LVTDs, each LVDT comprising an internal armature and a coil assembly, the coil assembly comprising a primary coil between two secondary coils;
   b) a threaded nut attached to the armatures;
   c) a rotating member having at least a portion threaded, the threaded nut being threaded to the threaded portion of the rotating member, whereby rotation of the rotating member translates the nut to move the armatures relative to the coil assemblies.

3. The LVDT system of claim 2 wherein the rotating member comprises a rotating input member and a rotating output member, the threaded portion of the rotating member being around the rotating output member, a gear reduction system between the rotary input member and the rotary output member for transferring the rotation of the rotating input member into rotation in the rotary output member and reducing the angular rotation of the rotary output member relative to the angular rotation of the rotary input member, whereby rotation of the rotary output member translates the nut.

4. The LVDT system of claim 2 further comprising a support member spaced from the nut, the support member having openings for receiving the armatures.

5. The LVDT system of claim 2 further comprising a support member spaced from the nut and receiving an end of the rotary output member.

6. The LVDT system of claim 5 wherein the support member has openings for receiving the armatures.

7. A method of measuring the amount of rotation in a rotating member comprising:
  a) threading a nut on the rotating member whereby the nut translates along the rotating member as the rotating member rotates;
  b) driving an armature of at least two LVTDs relative to a coil assembly of each LVDT, each coil assembly comprising a primary coil and two secondary coils, the armatures being operably connected to the nut whereby translation of the nut drives the armatures;
  c) comparing the voltage differences between the two secondary coils of each coil assembly.

8. The method of claim 7 wherein the rotating member comprises a rotating input member and a rotating output member, the threaded portion of the rotating member being around the rotating output member, the method further comprising reducing the angular rotation of the rotating output member relative to the rotating input member.

9. The method of claim 7 wherein the rotating member comprises a rotating input member and a rotating output member, the method further comprises providing a gear reduction assembly intercoupling the input member and the output member.

* * * * *